US012651016B2

(12) United States Patent

Gholamian et al.

(10) Patent No.: US 12,651,016 B2

(45) Date of Patent: Jun. 9, 2026

(54) SYSTEMS AND METHODS FOR HARMONIZED PRODUCT CLASSIFICATION

(71) Applicant: Thomson Reuters Enterprise Centre GmbH, Zug (CH)

(72) Inventors: Sina Gholamian, Toronto (CA); Stavroula Skylaki, Zug (CH); Varun Chandra, Hamilton (CA); Emre Caglar, Burlington (CA); Eduardo Vitor, Campinas (BR); Steven Rogers, Plano, TX (US); Anne Woelke, Dallas, TX (US); Jacqueline Nicole Martinez, London (GB); Gianfranco Romani, Schlieren (CH); Elizabeth E. Connell, Rochester, NY (US); Fernando Tochini Aliaga, Celina, TX (US)

( * ) Notice: Subject to any disclaimer, the term of this patent is extended or adjusted under 35 U.S.C. 154(b) by 0 days.

(21) Appl. No.: 18/938,244

(22) Filed: Nov. 5, 2024

(65) Prior Publication Data

US 2025/0147998 A1 May 8, 2025

Related U.S. Application Data

(60) Provisional application No. 63/596,302, filed on Nov. 5, 2023.

(51) Int. Cl.
*G06F 16/35* (2025.01)

(52) U.S. Cl.
CPC .................................... *G06F 16/35* (2019.01)

(58) Field of Classification Search
CPC .................................................... G06F 16/35
See application file for complete search history.

(56) References Cited

U.S. PATENT DOCUMENTS

| | | | |
|---|---|---|---|
| 12,099,566 B2 * | 9/2024 | Baek | G06N 3/047 |
| 2021/0141997 A1 * | 5/2021 | Pinnamaneni | G06F 16/81 |

(Continued)

OTHER PUBLICATIONS

Frantzolas, C. "Multi-Modal Models for Product Similarity," KTH Royal Institute of Technology, https://kth.diva-portal.org/smash/get/diva2:1783658/FULLTEXT01.pdf, 2023, 98 pages.

(Continued)

*Primary Examiner* — Dangelino N Gortayo

(74) *Attorney, Agent, or Firm* — Norton Rose Fulbright US LLP

(57) ABSTRACT

This disclosure provides systems, methods, and devices for automatic product classification using deep learning and generative artificial intelligence (AI) models for a harmonized system (HS) product classification. A method includes generating embeddings based on an input dataset. The method includes applying a deep learning model to the embeddings to produce a prediction set including classifications corresponding to the embeddings. The method includes converting the classifications to a first set of similarity metrics. The method includes determining a second set of similarity metrics based on the embeddings using a semantic similarity model. The method includes generating a third set of similarity metrics based on an output of the semantic similarity model. The method includes outputting a ranked set of predictions corresponding to the input dataset based on the first set of similarity metrics, the second set of similarity metrics, and the third set of similarity metrics.

20 Claims, 4 Drawing Sheets

(56)  References Cited

U.S. PATENT DOCUMENTS

2022/0374598 A1*  11/2022  Osuala ................... G06F 40/279
2023/0325725 A1   10/2023  Lester et al.
2023/0409614 A1*  12/2023  Hamilton ............ G06F 16/9024
2024/0330714 A1*  10/2024  Mukherjee ............. G06N 5/022
2024/0412226 A1*  12/2024  Mathur ................... G06F 9/453
2025/0005082 A1*   1/2025  Arun Koteeswaran ......................
                                         G06F 16/953

OTHER PUBLICATIONS

Patent Cooperation Treaty, International Search Report and Written
Opinion issued for PCT Application No. PCT/US2024/054596,
dated Jan. 16, 2025, 9 pages.
World Customs Organization, World Customs Organization (WCO)
Annual Report, 2022-2023, wcoomd.org, retrieved from https://
www.wcoomd.org/-/media/wco/public/global/pdf/about-us/annual-
reports/annual-report-2022_2023.pdf, 55 pages.
Harmonized Tariff Schedule. https://hts.usitc.gov/, 2023. Accessed
on Oct. 2023, 23 pages.
Achiam, J. et al. GPT-4 Technical Report, "OpenAI," https://arxiv.
org/abs/2303.08774, Mar. 2023, 100 pages.
Vaswani, A. et al. "Attention Is All You Need," Advances in Neural
Information Processing Systems, NIPS'17: Proceedings of the 31st
International Conference on Neural Information Processing Sys-
tems, Dec. 2017, 11 pages.
Central Customs Authority. https://www.zoll.de/EN/Businesses/
Movement-of-goods/Import/Duties-and-taxes/Normal-customs-
clearance/ Customs-Tariff/customs-tariff_node, 2023. Accessed on
Oct. 2023, 5 pages.

* cited by examiner

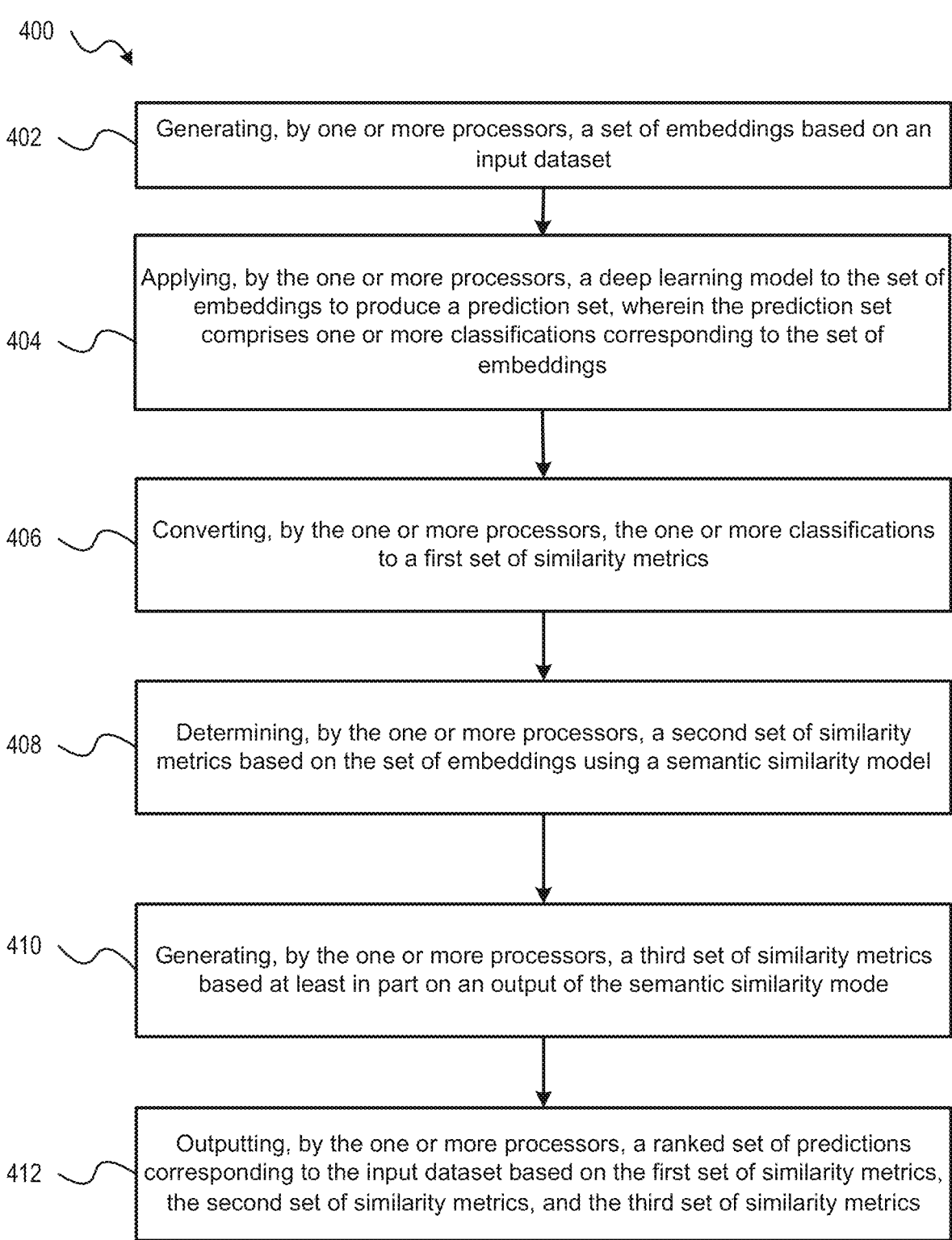

400

402 — Generating, by one or more processors, a set of embeddings based on an input dataset 404 — Applying, by the one or more processors, a deep learning model to the set of embeddings to produce a prediction set, wherein the prediction set comprises one or more classifications corresponding to the set of embeddings 406 — Converting, by the one or more processors, the one or more classifications to a first set of similarity metrics 408 — Determining, by the one or more processors, a second set of similarity metrics based on the set of embeddings using a semantic similarity model 410 — Generating, by the one or more processors, a third set of similarity metrics based at least in part on an output of the semantic similarity mode 412 — Outputting, by the one or more processors, a ranked set of predictions corresponding to the input dataset based on the first set of similarity metrics, the second set of similarity metrics, and the third set of similarity metrics

FIG. 4

SYSTEMS AND METHODS FOR HARMONIZED PRODUCT CLASSIFICATION

CROSS-REFERENCE TO RELATED APPLICATIONS

The present application claims the benefit of priority from U.S. Provisional Application No. 63/596,302 filed Nov. 5, 2023 and entitled "SYSTEMS AND METHODS FOR HARMONIZED PRODUCT CLASSIFICATION," the disclosure of which is incorporated by reference herein in its entirety.

TECHNICAL FIELD

The present invention relates to the field of artificial intelligence and machine learning technologies and more specifically, to systems and methods supporting enhanced classification techniques through use of multimodal classifiers.

BACKGROUND

Products may be classified for trade using a system of codes. For example, a harmonized system (HS) is a global standardized system that is used to categorize products (e.g., classify products using codes) for international trade. The HS was developed and is maintained by the World Customs Organization (WCO) to streamline classification and taxation of goods, simplify global trade, and to facilitate collection of international trade statistics. The HS may include a hierarchical structure with different level of codes (e.g., first two digits represent a broad category, the following two digits represent specific product classification of the broad category, the following two digits represent an even more specific classification further defining the product).

Products may be categorized with different length codes so that a shorter code (e.g., four digits) may be associated with a broad category while a longer code (e.g., six digits) may be associated with a specific category or a subcategory of the broad category. In some cases, additional digits may be added to the code, where the additional digits indicate association with a particular nation or country (e.g., code of up to ten digits).

Classification may be complex, for example, where classification involves knowledge of particular details related to the nature, composition, intended use, and industry of a product, to properly classify the product. Often, products may appear to match multiple categories where similar products may fall under different codes depending on minor distinctions. Moreover, the WCO's tariff schedule may be continuously updated and edited to reflect new information, changes, or feedback (e.g., is a living document) that is updated by WCO authorities. The WCO authorities may consistently review updates, as well as interpret classification rules, explanatory notes, case law, and guidelines provided by the WCO, to classify products. Accordingly, the classification may be subjective, such that different WCO authorities may associate the same product with different codes.

Inaccurate classification may result in fines and penalties for the parties involved in trading the product. The HS code may set the import and export tariff rates for a product (e.g., the tax that is collected by the customs to import or export the product). As such, if a product is incorrectly classified, the incorrect classification may result in the incorrect amount of tax paid or owed, further resulting in a significant financial, and in some cases, legal consequences, for the businesses and organizations involved.

BRIEF SUMMARY

Embodiments of the present disclosure provide systems, methods, and devices for automating the classification of products via support provided by artificial intelligence-based tools. For example, the disclosed embodiments may facilitate accurate classification of products using deep learning (e.g., machine learning (ML)) and generative artificial intelligence (AI) models for a harmonized system (HS) product classification.

As discussed herein, an ML model may be used to suggest relevant HS codes based on a product description. The ML model may be trained using historical data (e.g., examples of previous HS classifications). To assign an HS code to a new product (e.g., no historical data or previous classification for the product), the ML model may use patterns identified in the training data to make predictions based on model confidence scores.

In some cases, suggestion of the relevant HS codes using the ML model may be less useful when the historical data is limited or if the new product is dissimilar to examples provided in the training data. Moreover, the ML model may suggest a classification code and the corresponding probability without an explanation or rationale behind the classification. In such cases, to provide useful explanations of the suggestions provided by the ML model (e.g., simple language, easy to understand for a user), large language models (LLMs) may be combined with semantic similarity models to facilitate HS code suggestion in the absence of historical training data or similar product classifications.

In some examples, a voter may be used to provide accurate code suggestions since a hybrid approach may be used to provide the suggestions (e.g., the ML model is used for classification code suggestions when historical data for an inputted product is available or the combination of LLMs and semantic similarity models is used when historical data for the inputted product is unavailable). The "voter" may refer to an individual model in a collection of models that contributes to a final decision or suggestion of a classification. Each model in the collection may "vote" on the outcome, and the combined votes may be used to make a more accurate or robust final suggestions.

The voter may rank top k, where k refers to one or more, predictions from different models and may provide confidence scores and/or classification rationales. For example, when a product description is inputted into the models, the models may provide the top-3 (e.g., k=3) most probable HS codes for the inputted product description and the voter may rank the different predictions from the models. The voter may output the final top-3 predictions of classification (e.g., top 3 mostly likely correct HS codes).

To summarize, the techniques described herein involve deep learning combined with generative AI models for efficient and accurate HS code product classification. Accurate classification may be beneficial for at least correct application of taxes and duties in cross-border transactions. In the absence of historical training data, the techniques described herein may include integrating generative LLMs and semantic similarity models to overcome challenges associated with data scarcity (e.g., size or quantity of data below a threshold quantity). The techniques described herein may provide a ranking of the top-k HS code suggestions from different models and offer classification rationales and confidence scores for each of the suggestions. This hybrid deep learning and generative AI approach may address the inefficiencies and error susceptibility of the manual classification process. In addition to classification of new products, the techniques described herein may be used for auditing past manual classification and identify potential misclassifications, reducing potential risks that may otherwise occur in the future.

In an aspect, a method is disclosed and includes generating, by one or more processors, a set of embeddings based on an input dataset. The method includes applying, by the one or more processors, a deep learning model to the set of embeddings to produce a prediction set, where the prediction set includes one or more classifications corresponding to the set of embeddings. The method includes converting, by the one or more processors, the one or more classifications to a first set of similarity metrics. The method includes determining, by the one or more processors, a second set of similarity metrics based on the set of embeddings using a semantic similarity model. The method includes generating, by the one or more processors, a third set of similarity metrics based on an output of the semantic similarity model. The method includes outputting, by the one or more processors, a ranked set of predictions corresponding to the input dataset based on the first set of similarity metrics, the second set of similarity metrics, and the third set of similarity metrics.

In an aspect, the generative AI model includes a large language model, and the method further includes generating a prompt based on the output of the semantic similarity model, where the third set of semantic similarity metrics is generated based on the prompt. In an aspect, the deep learning model includes a convolutional neural network.

In an aspect, the method includes determining the ranked set of predictions based on the first set of similarity metrics, the second set of similarity metrics, and the third set of similarity metrics using a voting algorithm. In an aspect, each of the first set of similarity metrics, the second set of similarity metrics, and the third set of similarity metrics include at least one prediction, a similarity score associated with each prediction, and information providing explainability with respect to the similarity score and corresponding prediction.

In an aspect, the at least one prediction includes a classification corresponding to the input dataset. In an aspect, the first set of similarity metrics, the second set of similarity metrics, the third set of similarity metrics, or a combination thereof, includes multiple classifications for at least a portion of the input dataset. In some embodiments, systems and non-transitory computer-readable storage media configured to perform operations according to any of the above-described methods are disclosed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 4 is a process flow of an exemplary method for automated classification of products in accordance with aspects of the present disclosure.

Figure 1:
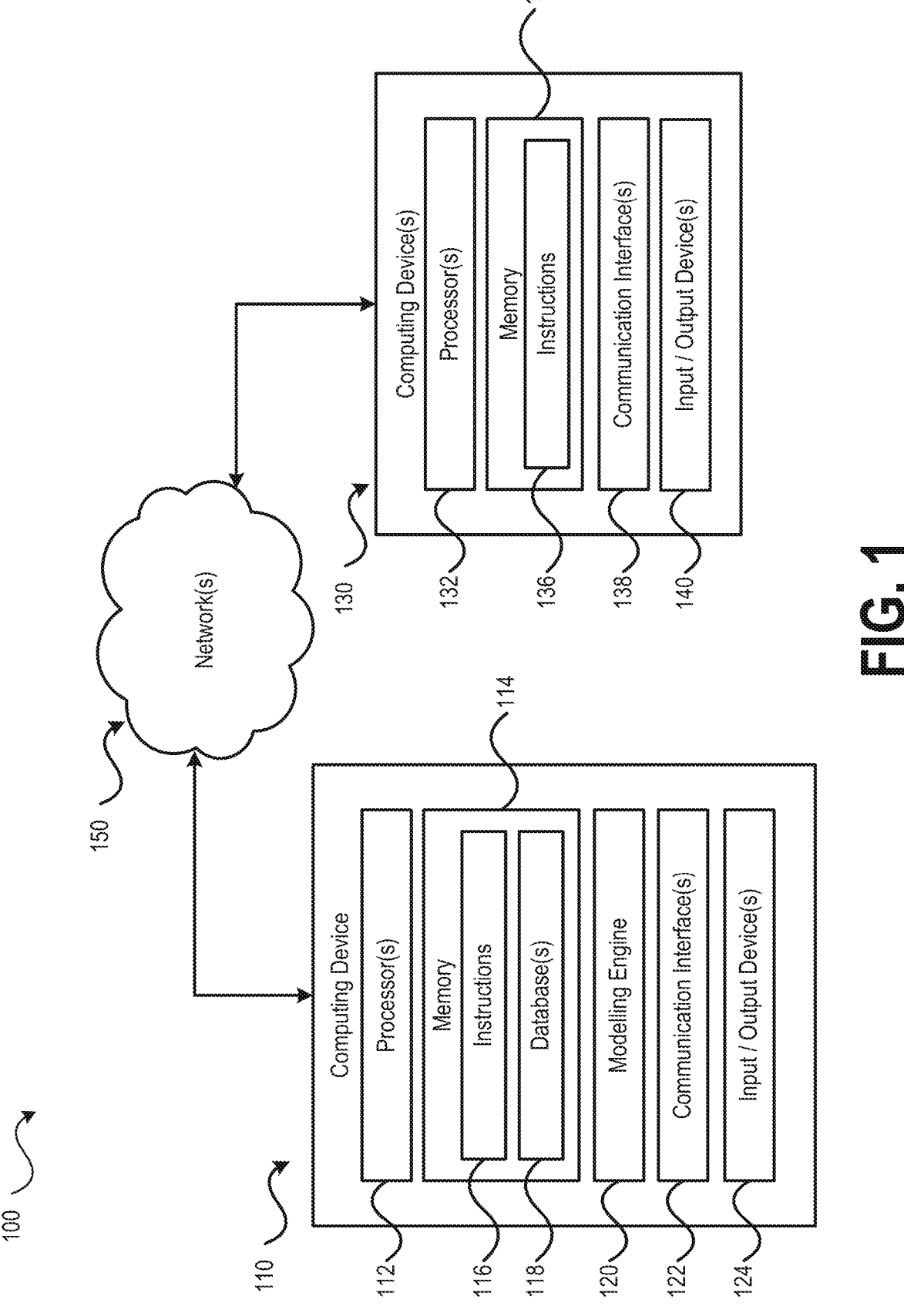
FIG. 1 is a block diagram of a system operating in accordance with aspects of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Products may be classified for trade using a system of codes. For example, a harmonized system (HS) may be used to classify the products, where products are classified using different codes. The HS may be a global standardized system used to categorize products for international trade. The HS was developed and is maintained by the World Customs Organization (WCO) to streamline classification and taxation of goods, simplify global trade, and to facilitate collection of international trade statistics. The HS may include a hierarchical structure with different level of codes (e.g., first two digits represent a broad category, the following two digits represent specific product classification of the broad category, the following two digits represent an even more specific classification further defining the product.)

Products may be categorized with different length codes so that a shorter code (e.g., four digits) may be associated with a broad category while a longer code (e.g., six digits) may be associated with a specific category or a subcategory of the broader category. In some cases, additional digits may be added to the code, where the additional digits indicate association with a particular nation or country (e.g., code of up to ten digits).

Classification may be complex, for example, where classification involves knowledge of particular details related to the nature, composition, intended use, and industry of a product, to properly classify the product. Often, products may appear to match multiple categories where similar products may fall under different codes depending on minor distinctions. Moreover, the WCO's tariff schedule may be continuously updated and edited to reflect new information, changes, or feedback (e.g., is a living document) that is updated by WCO authorities. The WCO authorities may consistently review updates, as well as interpret classification rules, explanatory notes, case law, and guidelines provided by the WCO, to classify products. Accordingly, the classification may be subjective, such that different WCO authorities may associate the same product with different codes.

The WCO may set the import and export tariff rates for a product (e.g., the tax that is collected by the customs to import or export the product). As such, if a product is incorrectly codified (e.g., classified), the incorrect classification may result in the incorrect amount of tax paid or owed, further resulting in significant financial, and in some cases, legal consequences for the businesses and organizations involved.

To efficiently and precisely classify a product, even if training data used for the ML model classifying is limited, the disclosed embodiments facilitate automated product classification by employing a multiple model architecture (e.g., AI models, ML models, LLMs, semantic similar models, deep learning models, generative models, etc.) The disclosed embodiments may also predict and rank multiple classification code suggestions for an inputted product. A system may generate, by one or more processors, a set of embeddings based on an input dataset. The system may apply, by the one or more processors, a deep learning model to the set of embeddings to produce a prediction set, where the prediction set includes one or more classifications corresponding to the set of embeddings. The system may convert, by the one or more processors, the one or more classifications to a first set of similarity metrics. The system may determine, by the one or more processors, a second set of similarity metrics based on the set of embeddings using a semantic similarity model. The system may generate, by the one or more processors, a third set of similarity metrics based at least in part on an output of the semantic similarity model. The system may include outputting, by the one or more processors, a ranked set of predictions corresponding to the input dataset based on the first set of similarity metrics, the second set of similarity metrics, and the third set of similarity metrics.

In some examples, the generative AI model includes a large language model, and the system may generate a prompt based on the output of the semantic similarity model, where the third set of semantic similarity metrics is generated based on the prompt. In some examples, the deep learning model includes a convolutional neural network.

In some examples, the system may include determining the ranked set of predictions based on the first set of similarity metrics, the second set of similarity metrics, and the third set of similarity metrics using a voting algorithm. In some examples, each of the first set of similarity metrics, the second set of similarity metrics, and the third set of similarity metrics include at least one prediction, a similarity score associated with each prediction, and information providing explainability with respect to the similarity score and corresponding prediction.

In some examples, the at least one prediction includes a classification corresponding to the input dataset. In some examples, the first set of similarity metrics, the second set of similarity metrics, the third set of similarity metrics, or a combination thereof, includes multiple classifications for at least a portion of the input dataset. The system may facilitate accurate and automated classification of HS codes for products, for example, to ensure that accurate taxes and duties are applied by customs authorities, avoiding penalty fees.

Referring to FIG. 1 a block diagram of a system operating in accordance with aspects of the present disclosure is shown as a system 100. The system 100 includes a computing device 110 configured to receive a product description as input, such as from a computing device 130 via one or more networks 150, and to produce, as output, a product classification (e.g., HS code) or top-k product classifications with respective scores, as well as rationales for each of the top-k predicted product classifications explaining reasoning for the prediction or score. It is noted that while FIG. 1 is primarily described with reference to functionality provided by computing device 110, it should be understood that the functionality described herein may be provided in a distributed computing environment, such as using a plurality of computing devices 110, or a cloud-based deployment.

As illustrated in FIG. 1, the computing device 110 includes one or more processors 112, a memory 114, a modelling engine 120, one or more communication interfaces 122, and input/output (I/O) devices 124. The one or more processors 112 may include a central processing unit (CPU), graphics processing unit (GPU), a microprocessor, a controller, a microcontroller, a plurality of microprocessors, an application-specific integrated circuit (ASIC), an application-specific standard product (ASSP), or any combination thereof. The memory 114 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. The memory 114 may also store instructions 116 that, when executed by the one or more processors 112, cause the one or more processors 112 to perform operations described herein with respect to the functionality of the computing device 110 and the system 100. The memory 114 may further include one or more databases 118, which may store data associated with operations described herein with respect to the functionality of the computing device 110 and the system 100.

The communication interface(s) 122 may be configured to communicatively couple the computing device 110 to the one or more networks 150 via wired and/or wireless communication links according to one or more communication protocols or standards. The I/O devices 124 may include one or more display devices, a keyboard, a stylus, a scanner, one or more touchscreens, a mouse, a trackpad, a camera, one or more speakers, haptic feedback devices, or other types of devices that enable a user to receive information from or provide information to the computing device 110.

The one or more databases 118 may be configured to store information and/or documents. For example, the one or more databases 118 may include one or more databases storing training data, data associated with a particular organization (e.g., proprietary data), HS codes, and other data that may be used for generative modeling (e.g., predicting product classification for a product based on patterns associated with stored data for other products), as discussed with respect to FIG. 2 and FIG. 3. For example, training data to support training of one or more large language models, transformer models, and the like may also be stored at the one or more databases 118.

Figure 2:
FIG. 2 is a flow diagram for automated classification of products in accordance with aspects of the present disclosure.
Figure 2:
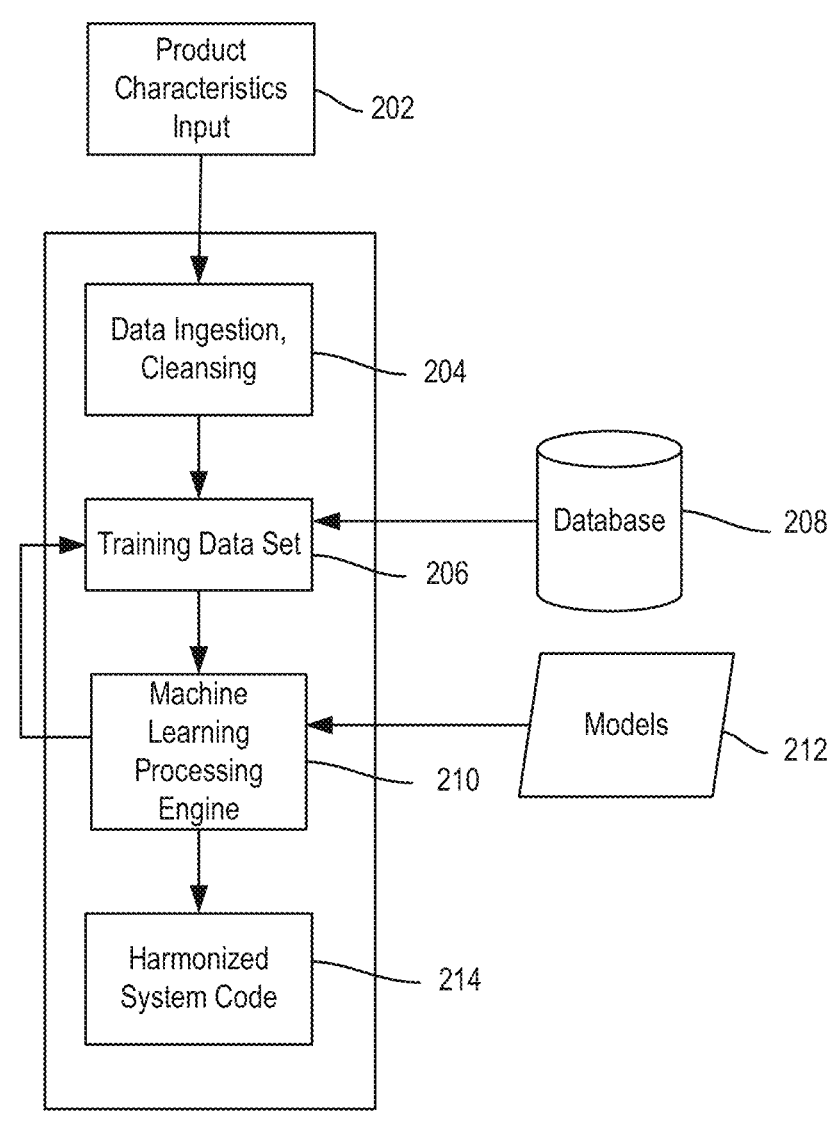
Figure 3:
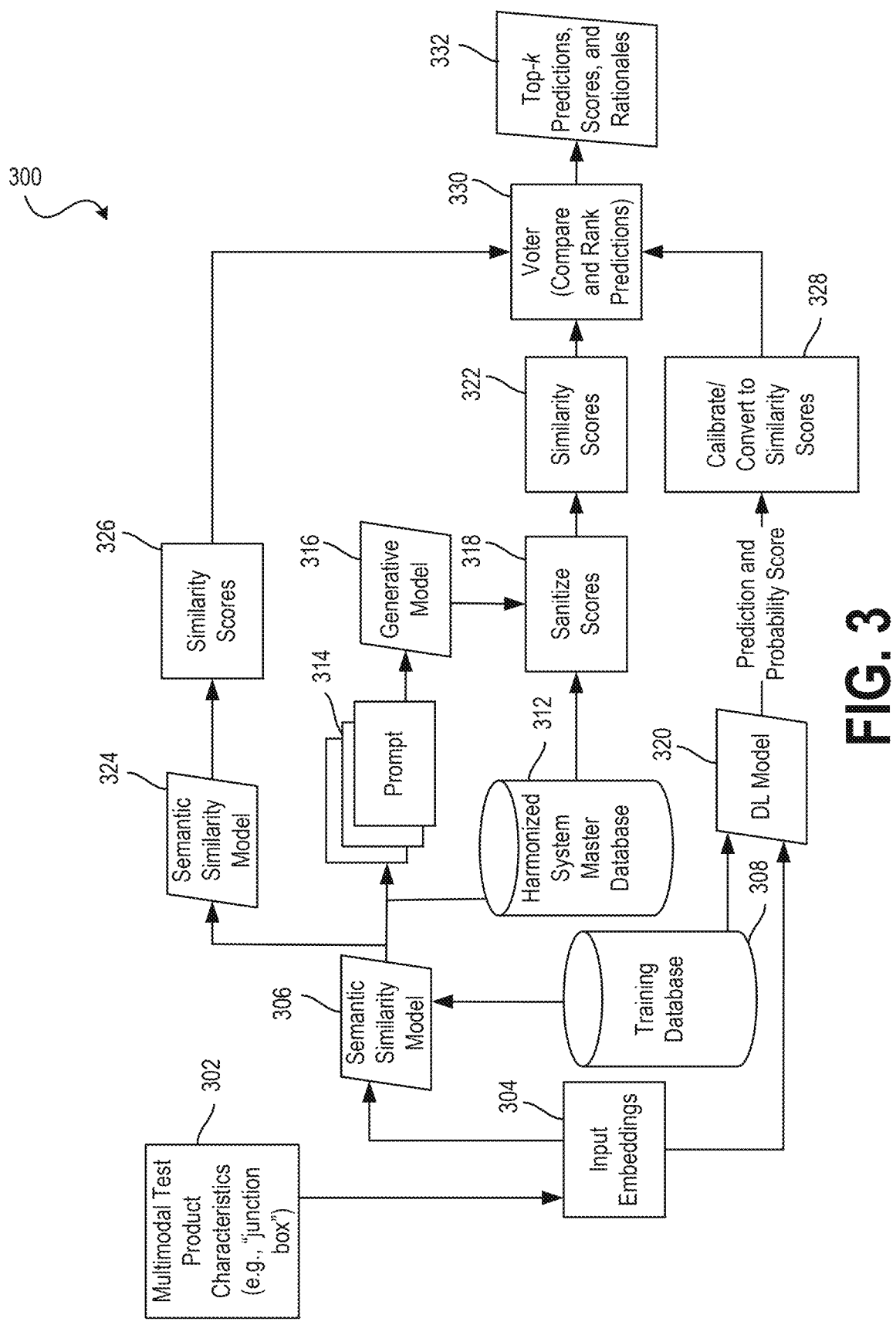
FIG. 3 is a flow diagram for automated classification of products in accordance with aspects of the present disclosure.

The modelling engine 120 may be configured to support operations for accurate classification of products using machine ML and AI models for an HS product classification, as discussed in detail with respect to FIG. 2 and FIG. 3. Although the following discussions describe the modelling engine 120 as performing the classification techniques described herein, the techniques may be performed, additionally or alternatively, by the computing device 110 or any components of the computing device 110. For example, the modelling engine 120 may be configured to generate, by one or more processors, a set of embeddings based on an input dataset. The modelling engine 120 may apply, by the one or more processors, a deep learning model to the set of embeddings to produce a prediction set, wherein the prediction set may include one or more classifications corresponding to the set of embeddings. The modelling engine 120 may convert, by the one or more processors, the one or more classifications to a first set of similarity metrics. The modelling engine 120 may determine, by the one or more processors, a second set of similarity metrics based on the set of embeddings using a semantic similarity model. The modelling engine 120 may generate, by the one or more processors, a third set of similarity metrics based at least in part on an output of the semantic similarity model. The modelling engine 120 may output, by the one or more processors, a ranked set of predictions corresponding to the input dataset based on the first set of similarity metrics, the second set of similarity metrics, and the third set of similarity metrics.

In some examples, the generative AI model may include a large language model, and the modelling engine 120 may further generate a prompt based on the output of the semantic similarity model, wherein the third set of semantic similarity metrics is generated based on the prompt. In some examples, the deep learning model may include a convolutional neural network. In some examples, the modelling engine 120 may determine the ranked set of predictions based on the first set of similarity metrics, the second set of similarity metrics, and the third set of similarity metrics using a voting algorithm. In some examples, each of the first set of similarity metrics, the second set of similarity metrics, and the third set of similarity metrics comprise at least one prediction, a similarity score associated with each prediction, and information providing explainability with respect to the similarity score and corresponding prediction. In some examples, the at least one prediction may include a classification corresponding to the input dataset. In some examples, the first set of similarity metrics, the second set of similarity metrics, the third set of similarity metrics, or a combination thereof, comprises multiple classifications for at least a portion of the input dataset.

FIG. 2 is a flow diagram 200 for automated classification of products in accordance with aspects of the present disclosure, and is described in detail in FIG. 3. The flow diagrams described herein, including the flow diagram 200, may implement aspects of or may be implemented by aspects of the system 100. In the following descriptions of flow diagrams described herein, including the flow diagram 200, the operations performed may be performed in different orders or at different times than the exemplary order shown. Some operations and/or components may also be omitted from the flow diagram 200, or other operations and/or components may be added to the flow diagram 200. The examples described herein are not to be construed as limiting, as the described features may be associated with any quantity of different devices. Although the techniques described herein are described with respect to a HS, the techniques may apply to any other type of classification or codification system.

The flow diagram 200 for product classification may involve machine learning and data from a variety of sources. For example, the classification system may use a deep learning model, a generative AI model, and a semantic similarity model, to deliver precise classifications, along with rationales and confidence scores for each predicted classification for a product.

At 202, the product classification process may involve inputting product characteristic. The product characteristics input may involve gathering product characteristics (e.g., data) from several sources. The sources may include user data, which may be collected from user interfaces, application programming interfaces (APIs), and enterprise resource planning (ERP) systems. As an example, a user may be a customer or a client that uses a software and service for product classification.

The dataset may also include content from other databases (e.g., company dataset, priority data, etc.), associated with product taxonomies, historical information, tariff schedule section and chapter and WCO explanatory notes, binding ruling, and other fields or technologies that may be helpful with product classification.

At 204, the classification process may include data ingestion and cleaning. After the data collection in 202, classifying may include cleansing and preparing the data to create a robust dataset for model training and validation. The data ingestion and cleansing may include formatting the data into a suitable structure, sanitizing data, and address any missing values. The data ingestion and cleansing may include multimodals of input information, including but not limited to, textual descriptions and images of the products.

At 206, the classification process may include a training data set. The training data set may include content associated with the business performing the classification (e.g., proprietary data) from a database 208. For example, the database 208 may include proprietary content and data, product classification taxonomy, customer hierarchical classification, and so forth. For example, the database 208 may include an indication of a classification associated with certain inputted product characteristics.

At 210, the classification process may include a machine learning processing engine (e.g., modelling engine 120). The machine learning processing engine may integrate a variety of different and complementary models. For example, the machine learning process may include unique, business or organization proprietary deep learning model, a generative AI model, and a semantic similarity model (e.g., models 212). The combination of these distinct models may result in accurate classifications, providing not only the predictions, but also the rationale behind each prediction and confidence scores.

The deep learning architecture associated with classifying a product may include a Convolutional Neural Network (CNN) model. The CNN model may include a category of deep learning models that employ convolutional layers to identify and understand patterns within historical product classification data, facilitating in classifying new products by mapping similarities between the new products and the historical data. Additionally, the techniques discussed herein are not limited to just the use of CNN. Different ML models may be used (e.g., add new ones, remove previous ones, etc.) as appropriate, allowing for a custom ML model or collection of ML models (e.g., as an alternative or in addition to the CNN model).

The classification process may include using a semantic similarity model, which utilizes a transformers architecture. The semantic similarity model may convert text into dense vector representations as embeddings, where semantically similar texts describing products have vectors that are close to each other. This semantic similarity model may be used to understand the context and semantic similarity between products and classify accordingly.

At the machine learning processing engine 210, the system may incorporate a generative AI models, such as LLMs, for product classification. The generative AI models may be used based on the large quantity of harmonized tariff schedule and product taxonomies training data. The generative AI models may also be used based on the generative capabilities, where the large quantity of training data is used to learn how to create statistically likely responses to new inputs (e.g., generate new data instances that are similar to the training data). Such generative characteristics increase an understanding of products, provide classification prediction accuracy, and provide prediction rationale generation.

At 214, the classification process may include an HS coding. The output of the HS coding (e.g., after the flow of information and process outputs at 202 through 210) is a list of top-k HS code predictions for each product, accompanied by respective confidence scores and classification rationales. The outputted rationales ensure explainability in predictions and helps users understand the reasoning behind each prediction.

FIG. 3 is a flow diagram 300 for automated classification of products in accordance with aspects of the present disclosure. The flow diagram 300 facilities in accurately classifying a new product within the HS by assigning the most appropriate HS code. The flow diagram 300 also facilities in providing a relevant rationale and a prediction confidence score for each predicted HS code. The flow 300 illustrates how product characteristics may be employed for product classification. Product characteristics may encompass a wide range of multimodal attributes.

The flow diagram 300, may implement aspects of or may be implemented by aspects of the system 100. In the following descriptions of flow diagrams described herein, including the flow diagram 300, the operations performed may be performed in different orders or at different times than the exemplary order shown. Some operations and/or components may also be omitted from the flow diagram 300, or other operations and/or components may be added to the flow diagram 300. The examples described herein are not to be construed as limiting, as the described features may be associated with any quantity of different devices. Although the techniques described herein are described with respect to a HS, the techniques may apply to any other type of classification or codification system.

In the flow diagram 300, the classifying process includes an input of multimodal test product characteristics. As an example, the product description may be "Junction box" as the input. As multimodal inputs are provided to the system, the inputs may be converted into input encodings or embeddings to transform and combine inputs from different domains, such that they are in a common format for further processing.

The input embeddings may be provided as an input into a semantic similarity model 306. To generate the input embeddings, a comprehensive training database 308 of historical data related to past product classifications may be used. The product data stored in the training database 308 may include data indicating previous product classifications for products and the correctly assigned HS codes for the products. The training database 308 may provide foundation of the training data set that is used for training and semantic search for deep learning models and semantic similarity models. The training data may be inputs into the semantic similarity model 306 and the deep learning model 320. These models may be trained and compared with the test data (e.g., "Junction box").

As an example, five product descriptions may exist in the training database along with an indication of the respective 10-digit HS codes. The five products and respective codes may include an Electrical box, HS: 8536908585, an HGH Vol junction, HS: 8536908530, a control box, HS: 8538100000, an enclosure panel, HS: 8503009550, and wood panel, HS: 4412100500. The training set may also include HS codes with a varying quantity of digits, such as 2 digits, 4 digits, and so forth. The training database 308 and the HS master database 312 may be augmented with data synthesis techniques to help with generative AI models, for example, to provide HS codes for products that are unavailable in the historical products (e.g., in the training data of the training database 308).

At the semantic similarity model 306 may be parameterized by a threshold variable, $Th_1$. The semantic similarity model 306 may be designed to identify and compare the semantic similarities between different product descriptions. For example, the semantic similarity model 306 may receive the test product description input, "Junction box", and use the available training set. The training dataset of the training database 308 may be a collection of various product descriptions with respective HS classifications that the semantic similarity model 306 uses as a reference point to determine similarities.

The semantic similarity model 306 may assign a similarity score to each data point (e.g., each inputs received, such as the "Junction box" as an input) and output the top-k products in the training dataset that are the most similar to the test product based on their descriptions. The threshold $Th_1$, e.g., 50%, allows to configure the level of similarity between products in the train database and the test product. The semantic similarity model 306 may be not limited to finding products with descriptions that closely match the test product description, but also may also identify semantic similarities between products in the training database 308 and the test product. For example, the semantic similarity model might assign the following similarity scores and output products with scores higher than 50%: electrical box (8536908585); 72%, HGH Vol junction (8536908530); 63%, control box (8538100000); 63%, enclosure panel (8503009550); 52%, wood panel (4412100500), 42%.

The predictions may be an input to a prompt 314, which also receives an input from the HS master database 312 containing valid HS codes, along with additional extracted artifacts and metadata. The HS (e.g., or harmonized schedule), as previously mentioned, is a globally recognized classification taxonomy for products that use HS codes. These codes may be up to 6 digits, and the system is regulated and maintained by the WCO. The WCO's HS codes may often expanded in various jurisdictions to provide more detailed product classifications. These codes can be extended up to 10 digits, or even further in some jurisdictions. For example, the United States International Trade Commission (ITC) oversees the Harmonized Tariff Schedule (HTS) and regulates codes up to 10 digits for all items imported into the United States. In addition to HS codes and HTS codes, the master database 312 may include additional context data, such as business or organization proprietary metadata that facilitates in refining classification from an originally outputted HS code or HTS code. The context and metadata may be integrated into the classification process before making predictions via the generative AI model (e.g., at the generative model 316). In addition, after the generative AI model has produced predictions, the predictions are then cleaned or "sanitized" 318 to remove any inaccuracies. Sanitizing the scores 318 may involve using the HS master database 312 and ensure that the final predicted HS codes are valid. This dataset may also have been augmented (e.g., like the training database 308).

In some examples, the HS master database 312 may be associated with or use a deep learning model 320 that is trained with historical product classifications sourced from the training database 308. In addition to various supervised learning models or architecture may be used to make predictions, a CNN may be used, as discussed with respect to FIG. 2. The CNN may provide predictions by comparing the test product with the historical training data that are parameterized within the model. For example, the CNN model may output top-3 predictions as ['8536908530', '8503009550', '8538100000'], with probability scores, [0.81, 0.11, 0.05], respectively.

The probability scores that are outputted from the deep learning model 320 may be calibrated 328 and converted into similarity scores. The calibration 328 may standardize the prediction scores, aligning them with the outputs from other models used the classification process (e.g., the prediction scores are transformed to be on the same scale or format as the outputs from other models), allowing for consistent comparison of different model outputs (e.g., for a later voter stage of the classification process). For our example, this the CNN may provide predictions ['8536908530', '8503009550', '8538100000'], with test similarity scores of [72%, 58%, 63%], respectively.

At the prompt 314, a prompt template may be an input context to the generative model 316. This prompt template may receive and process inputs from multiple sources. For example, the prompt template may receive and integrate the outputs from the semantic similarity model 306, test product data, and information from the HS master database 312. By combining the sets of inputs, the prompt template may provide the generative model 316 with a comprehensive view of the data, facilitating more accurate and context-aware predictions. In addition, a set of prompt optimization techniques may be used to further help and align the generative model 316 in generating predictions. Continuing with the "junction box" example, similar products such as "electrical box (8536908585)", "HGH Vol junction (8536908530)", "control box (8538100000)", and "enclosure panel (8503009550)" ($th_1 > 50\%$) may be added to the prompt to allow the model to observe similar examples with the respective HS codes.

The generative model 316 may generate predictions for the test product (e.g., "junction box") and output top-k predictions with respective rationales and confidence scores. The generative model, such as a GPT-4 from OpenAI, may be used. The generative model (e.g., GPT-4) may be a machine learning model trained with a large quantity of internet data, and it may have a concept of various products and their respective categories. In this context, the generative model 316 may be used to make predictions for the test product, "Junction box." The generative model 316 may receive the output from the prompt 314 and use it as an input, including the outputs from the semantic similarity model 306, the test product data, and the information from the HS master database 312.

The prompt 314 may provide the generative model 316 with a comprehensive view of the data necessary to make accurate HS predictions. The generative model 316 may then processes the input from the prompt 314 and output the top-k predictions. Each prediction may include the predicted HS code, a rationale for the predicted HS code, and a confidence score for the predicted HS code. The rationale may explain why the generative model 316 made the particular prediction, providing insight into the decision-making process. The confidence score may indicate the model's level of certainty about each prediction. The use of a generative model 316 may facilitate in generating new predictions that may not be directly present in the training data. The ability to generate new predictions based on learned patterns and similarities during pretraining that are absent from our training database, may allow the generative model 316 to handle a wide range of product descriptions, including those that are significantly different from the examples in the training data. This flexibility makes the generative model 316 an important aspect of the classification techniques described herein. As an example, the generative model 316 may output top-3 predictions as ['8538908180', '8473309100', '8536908531'], along with respective rationales.

The classification process may include receiving the predictions from the generative model 316 and receiving the valid HS codes from the HS master database 312, and ensuring that the model predictions are valid HS codes by sanitizing the scores 318. For example, the last output from the generative model 316 of '8536908531' may be changed to '8536908530', since the '8536908531' may be inaccurate and is a non-existing HS code.

The classification process may include generating similarity scores 322 by converting the model confidence scores from the generative model 316 to a standardized scale that is comparable with the predictions form other models. The conversion may ensure a fair comparison of predictions across different models. For example, the scores for the list of sanitized generative model prediction are [59%, 59%, 63%].

The classification process may include generating similarity scores 324, for example, using model similar to or the same as the semantic similarity model 306, with possibly a higher threshold, $Th_2$ (e.g., 60%) to bring top-k similar examples from the training set directly to a final voting. The outputs from the similarity scores 324 may include '8536908585 (72%)', '8538100000' (63%), '8536908530' (63%). The outputs from the semantic similar model 324 may output similarity scores 326, involving the conversion of scores from the semantic similarity model 324 to a unified scale.

The classification process may include voting 330 using a voter module that compares and ranks predictions. In particular, voting 330 involves a "voter" mechanism that receives and assesses predictions from three different model paths including a deep learning path associated with the deep learning model 320, a generative path associated with the generative model 316, and a semantic similarity path associated with the semantic similar model 324. The voter may rank predictions based on their scores and output the top-k predictions and their corresponding rationales and scores. For the predictions that are chosen from the deep learning model path or semantic similarity path, the HS master database 312, as well as the generative model 316, may be used to create rationales in a natural language text format that may be presented to the user. In addition, the voter may further calibrate the scores based on the prediction received from various models.

The output of the classification process may include the top-k predictions and scores 332, the respective corresponding adjusted scores, and the rationale for each prediction. This output provides the product classifications, as well as gives insight into the reasoning behind each classification. For our example, the top-3 predictions are ['8536908585', '8538100000', '8536908530'], with their score of [61%, 50%, 49%], and one of the rationales may include: The product is similar to Electrical box. The product "Electrical box" refers to an automotive electrical box, a crucial component used in vehicles for housing and protecting various electrical connections and circuits from external factors such as dust, moisture, and heat, ensuring the smooth operation of electrical systems within the vehicle, and it falls under the category of "Electrical machinery and equipment and parts thereof" with a harmonized schedule code of 8536908585 and is under the category of Electrical machinery, equipment, and parts; sound and television recorders and reproducers, Switching, protecting, and connecting electrical apparatus <=1000 V and optical fiber connectors, Other electrical apparatus for switching, protecting, or connecting circuits, Excluding battery clamps, motor vehicles, motorcycles, and electrical terminals, Electrical distribution ducts and junction boxes excluded.

Another rationale includes: The product is similar to Control box. The product "Control box" refers to an electrical device used primarily in the automotive industry, designed to manage and regulate various electrical systems within a vehicle, such as engine control, transmission systems, and other electronic components, falling under the Harmonized Tariff Schedule code 8538100000, which categorizes it as a part of electrical machinery and equipment used for switching, protecting, or making connections to or in electrical circuits and is under the category of Electrical machinery, equipment, and parts; sound and television recorders and reproducers, Parts for electrical apparatus for switching, protecting, and connecting circuits (voltage <=1000 V and >1000 V), Boards, panels, consoles, desks, cabinets for electric control or distribution (excluding equipped apparatus).

Another rationale includes: The product is similar to HGH Vol junction. The product "HGH Vol junction" refers to a high voltage junction box, which is an essential component in the automotive industry, designed to securely house and protect electrical connections and circuits from high voltage, ensuring safe and efficient operation of various electrical systems within a vehicle and is under the category of Electrical machinery, equipment, and parts; sound and television recorders and reproducers, Switching, protecting, and connecting electrical apparatus <=1000 V and optical fiber connectors, Other electrical apparatus for switching, protecting, or connecting circuits, Excluding battery clamps, motor vehicles, motorcycles, and electrical terminals, Junction boxes.

In conclusion, the classification process described in FIG. 3 represent a robust and thorough process that combines various models and methods for suggesting product classifications. By leveraging a comprehensive database of HS codes, historical data, and several machine learning models, the process ensures accuracy and detail in the predictions. The final output provides the product classifications, as well as also offers insight into the rationale behind each classification and model confidence scores, ensuring a high level of classification explainability.

Referring to FIG. 4, a flow diagram of an exemplary method 400 for automated classification of products in accordance with aspects of the present disclosure is shown. In an aspect, the method 400 may be performed by a computing device, such as the computing device 110 having a modelling engine 120 configured in accordance with aspects of the present disclosure. In an aspect, steps of the method 400 may be stored as instructions that, when executed by one or more processors, cause the one or more processors to perform operations of the method 400 and the concepts described herein. In the following description of the method 400, the operations performed may be performed in different orders or at different times than the exemplary order shown. Some operations may also be omitted from the method 400, or other operations may be added to the method 400. Further, while operations in the process flow 400 are illustrated as being performed by the computing device 110, the examples herein are not to be construed as limiting, as the described features may be associated with any quantity of different device.

At step 402, the method 400 includes generating, by one or more processors, a set of embeddings based on an input dataset. At step 404, the method 400 includes applying, by the one or more processors, a deep learning model and/or an AI model to the set of embeddings to produce a prediction set, wherein the prediction set may include one or more classifications corresponding to the set of embeddings. The deep learning model may include a convolutional neural network.

At step 406, the method 400 includes converting, by the one or more processors, the one or more classifications to a first set of similarity metrics. At step 408, the method 400 includes determining, by the one or more processors, a second set of similarity metrics based on the set of embeddings using a semantic similarity model. The generative AI model may include an LLM, the method further comprising generating a prompt based on the output of the semantic similarity model, wherein the third set of semantic similarity metrics is generated based on the prompt.

At step 410, the method 400 includes generating, by the one or more processors, a third set of similarity metrics based at least in part on an output of the semantic similarity model. In some examples, each of the first set of similarity metrics, the second set of similarity metrics, and the third set of similarity metrics comprise at least one prediction, a similarity score associated with each prediction, and information providing explainability with respect to the similarity score and corresponding prediction. In some examples, the at least one prediction may include a classification corresponding to the input dataset. In some examples, the first set of similarity metrics, the second set of similarity metrics, third set of similarity metrics, or a combination thereof, may include multiple classifications for at least a portion of the input dataset.

At step 412, the method 400 includes outputting, by the one or more processors, a ranked set of predictions corresponding to the input dataset based on the first set of similarity metrics, the second set of similarity metrics, and the third set of similarity metrics. In some examples, the ranked set of predictions are determined based on the first set of similarity metrics, the second set of similarity metrics, and the third set of similarity metrics using a voting algorithm In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

The invention claimed is:

1. A method comprising:
generating, by one or more processors, a set of embeddings based on an input dataset;
applying, by the one or more processors, a deep learning model, a generative artificial intelligence model, or both, to the set of embeddings to produce a prediction set, wherein the prediction set comprises one or more classifications corresponding to the set of embeddings;
converting, by the one or more processors, the one or more classifications to a first set of similarity metrics;
determining, by the one or more processors, a second set of similarity metrics based on the set of embeddings using a semantic similarity model;
generating, by the one or more processors, a third set of similarity metrics based at least in part on an output of the semantic similarity model; and
outputting, by the one or more processors, a ranked set of predictions corresponding to the input dataset based on the first set of similarity metrics, the second set of similarity metrics, and the third set of similarity metrics.

2. The method of claim 1, wherein the generative artificial intelligence model comprises a large language model, the method further comprising generating a prompt based on the output of the semantic similarity model, wherein the third set of semantic similarity metrics is generated based on the prompt.

3. The method of claim 1, wherein the deep learning model comprises a convolutional neural network.

4. The method of claim 1, further comprising determining the ranked set of predictions based on the first set of similarity metrics, the second set of similarity metrics, and the third set of similarity metrics using a voting algorithm.

5. The method of claim 4, wherein each of the first set of similarity metrics, the second set of similarity metrics, and the third set of similarity metrics comprise at least one prediction, a similarity score associated with each prediction, and information providing explainability with respect to the similarity score and corresponding prediction.

6. The method of claim 5, wherein the at least one prediction comprises a classification corresponding to the input dataset.

7. The method of claim 1, wherein the first set of similarity metrics, the second set of similarity metrics, the third set of similarity metrics, or a combination thereof, comprises multiple classifications for at least a portion of the input dataset.

8. An apparatus, comprising:
one or more memories storing processor-executable code; and
one or more processors coupled with the one or more memories and individually or collectively operable to execute the code to cause the apparatus to:
generate a set of embeddings based on an input dataset;
apply a deep learning model, a generative artificial intelligence model, or both, to the set of embeddings to produce a prediction set, wherein the prediction set comprises one or more classifications corresponding to the set of embeddings;
convert the one or more classifications to a first set of similarity metrics;
determine a second set of similarity metrics based on the set of embeddings using a semantic similarity model;
generate a third set of similarity metrics based at least in part on an output of the semantic similarity model; and
output a ranked set of predictions corresponding to the input dataset based on the first set of similarity metrics, the second set of similarity metrics, and the third set of similarity metrics.

9. The apparatus of claim 8, wherein the generative artificial intelligence model comprises a large language model, the one or more processors coupled with the one or more memories and individually or collectively operable to execute the code to cause the apparatus to:
comprise generating a prompt based on the output of the semantic similarity model, wherein the third set of semantic similarity metrics is generated based on the prompt.

10. The apparatus of claim 8, wherein the deep learning model comprises a convolutional neural network.

11. The apparatus of claim 8, the one or more processors coupled with the one or more memories and individually or collectively operable to execute the code to cause the apparatus to:
determine the ranked set of predictions based on the first set of similarity metrics, the second set of similarity metrics, and the third set of similarity metrics using a voting algorithm.

12. The apparatus of claim 8, wherein each of the first set of similarity metrics, the second set of similarity metrics, and the third set of similarity metrics comprise at least one prediction, a similarity score associated with each prediction, and information providing explainability with respect to the similarity score and corresponding prediction.

13. The apparatus of claim 8, wherein the at least one prediction comprises a classification corresponding to the input dataset.

14. The apparatus of claim 8, wherein the first set of similarity metrics, the second set of similarity metrics, the third set of similarity metrics, or a combination thereof, comprises multiple classifications for at least a portion of the input dataset.

15. A non-transitory computer-readable medium having instructions that, when executed by one or more processors, causes the one or more processors to:

generate a set of embeddings based on an input dataset;

apply a deep learning model, a generative artificial intelligence model, or both, to the set of embeddings to produce a prediction set, wherein the prediction set comprises one or more classifications corresponding to the set of embeddings;

convert the one or more classifications to a first set of similarity metrics;

determine a second set of similarity metrics based on the set of embeddings using a semantic similarity model;

generate a third set of similarity metrics based at least in part on an output of the semantic similarity model; and output a ranked set of predictions corresponding to the input dataset based on the first set of similarity metrics, the second set of similarity metrics, and the third set of similarity metrics.

16. The non-transitory computer-readable medium of claim 15, wherein the generative artificial intelligence model comprises a large language model, wherein the instructions are further executable by the one or more processors to:

comprise generating a prompt based on the output of the semantic similarity model, wherein the third set of semantic similarity metrics is generated based on the prompt.

17. The non-transitory computer-readable medium of claim 15, wherein the deep learning model comprises a convolutional neural network.

18. The non-transitory computer-readable medium of claim 15, wherein the instructions are further executable by the one or more processors to:

determine the ranked set of predictions based on the first set of similarity metrics, the second set of similarity metrics, and the third set of similarity metrics using a voting algorithm.

19. The non-transitory computer-readable medium of claim 15, wherein each of the first set of similarity metrics, the second set of similarity metrics, and the third set of similarity metrics comprise at least one prediction, a similarity score associated with each prediction, and information providing explainability with respect to the similarity score and corresponding prediction.

20. The non-transitory computer-readable medium of claim 15, wherein the at least one prediction comprises a classification corresponding to the input dataset.

* * * * *